(12) United States Patent
Lovell, Jr. et al.

(10) Patent No.: US 7,860,498 B2
(45) Date of Patent: Dec. 28, 2010

(54) SYSTEM AND METHOD FOR VIRTUAL CARRIER ADDRESSING AND ROUTING FOR GLOBAL SHORT MESSAGE SERVICE

(75) Inventors: Robert C. Lovell, Jr., Leesburg, VA (US); Eric Thomas Wimmer, Reston, VA (US)

(73) Assignee: Sybase 365, Inc., Reston, VA (US)

(*) Notice: Subject to any disclaimer, the term of this patent is extended or adjusted under 35 U.S.C. 154(b) by 1541 days.

(21) Appl. No.: 10/724,106

(22) Filed: Dec. 1, 2003

(65) Prior Publication Data
US 2005/0119017 A1    Jun. 2, 2005

(51) Int. Cl.
*H04W 4/00* (2009.01)
(52) U.S. Cl. .................. 455/433; 455/436; 455/439; 455/455; 455/558; 455/418
(58) Field of Classification Search .................. 455/433, 455/436, 439, 455, 462, 558, 418, 59, 60; 379/59, 60
See application file for complete search history.

(56) References Cited

U.S. PATENT DOCUMENTS

| | | | |
|---|---|---|---|
| 5,351,235 A | | 9/1994 | Lahtinen |
| 5,621,727 A | | 4/1997 | Vaudreuil |
| 5,719,918 A | * | 2/1998 | Serbetcioglu et al. ..... 380/271 |
| 5,768,509 A | | 6/1998 | Gunluk |
| 5,854,982 A | * | 12/1998 | Chambers et al. ........... 455/445 |
| 5,862,481 A | * | 1/1999 | Kulkarni et al. .......... 455/432.2 |
| 5,878,347 A | * | 3/1999 | Joensuu et al. .............. 455/433 |
| 5,887,249 A | | 3/1999 | Schmid |
| 5,894,478 A | | 4/1999 | Barzegar et al. |
| 6,101,382 A | * | 8/2000 | Granberg ................. 455/414.1 |
| 6,128,487 A | * | 10/2000 | Wiedeman ............... 455/426.1 |
| 6,181,935 B1 | * | 1/2001 | Gossman et al. ............ 455/433 |
| 6,208,870 B1 | | 3/2001 | Lorello et al. |
| 6,230,009 B1 | | 5/2001 | Holmes et al. |
| 6,240,293 B1 | | 5/2001 | Koster |
| 6,324,402 B1 | * | 11/2001 | Waugh et al. ............... 455/445 |
| 6,327,267 B1 | | 12/2001 | Valentine et al. |

(Continued)

FOREIGN PATENT DOCUMENTS

EP    0 777 394 A1    12/1995

(Continued)

OTHER PUBLICATIONS

International Search Report & Written Opinion, Jul. 26, 2006.

*Primary Examiner*—Nay A Maung
*Assistant Examiner*—Richard Chan
(74) *Attorney, Agent, or Firm*—Edell, Shapiro & Finnan, LLC

(57) ABSTRACT

Network system and methods for addressing and routing Short Message Service (SMS) messages from international callers to domestic callers using Global System for Mobile Communication (GSM) Mobile Application Part (MAP) Send Routing Info for Short Message (SRI for SM). The systems and methods create a virtual Home Location Register (HLR) and a virtual Mobile Switching Center (MSC) so that an intermediary, which is not itself a carrier, can handle such messages. The systems and methods generate and return an identifier associated with the intermediary as the location for an HLR and a MSC such that the international caller routes the SMS message to the intermediary.

14 Claims, 3 Drawing Sheets

U.S. PATENT DOCUMENTS

| | | | |
|---|---|---|---|
| 6,366,663 B1 | 4/2002 | Bauer et al. | |
| 6,421,437 B1 | 7/2002 | Slutsman | |
| 6,535,746 B1 | 3/2003 | Yu et al. | |
| 6,560,226 B1 | 5/2003 | Torrey et al. | |
| 6,594,254 B1 | 7/2003 | Kelly | |
| 6,658,259 B2 * | 12/2003 | McIntosh | 455/462 |
| 6,658,260 B2 | 12/2003 | Knotts | |
| 6,738,630 B2 | 5/2004 | Ashmore | |
| 6,772,267 B2 | 8/2004 | Thaler et al. | |
| 6,782,276 B1 * | 8/2004 | Lam et al. | 455/560 |
| 6,836,477 B1 * | 12/2004 | West et al. | 370/352 |
| 6,970,719 B1 * | 11/2005 | McConnell et al. | 455/554.1 |
| 6,978,156 B1 * | 12/2005 | Papadopoulos et al. | 455/558 |
| 7,336,941 B1 * | 2/2008 | Clingerman et al. | 455/404.1 |
| 2002/0015403 A1 | 2/2002 | McConnell et al. | |
| 2002/0029189 A1 | 3/2002 | Titus et al. | |
| 2002/0112014 A1 | 8/2002 | Bennett et al. | |
| 2002/0167909 A1 | 11/2002 | Balazinski et al. | |
| 2003/0083078 A1 | 5/2003 | Allison et al. | |
| 2003/0118027 A1 | 6/2003 | Lee et al. | |
| 2003/0171119 A1 * | 9/2003 | McIntosh | 455/445 |
| 2003/0202521 A1 | 10/2003 | Havinis et al. | |
| 2004/0032856 A1 | 2/2004 | Sandstrom | |
| 2005/0108417 A1 * | 5/2005 | Haumont | 709/232 |

FOREIGN PATENT DOCUMENTS

| | | |
|---|---|---|
| EP | 0 959 600 A1 | 4/1999 |
| WO | WO 97/36434 | 3/1996 |
| WO | WO 97/20442 | 11/1996 |
| WO | WO 99/11078 | 8/1998 |
| WO | WO 99/33226 | 12/1998 |
| WO | WO 00/41533 | 1/2000 |
| WO | WO 02/25875 A1 | 9/2001 |

* cited by examiner

SMR_GET_ROUTING_INFO — 245

| Byte | Content |
|---|---|
| 1 | 0 (Priority Request) |
| 2 | 32100 (Message Reference) |
| 3 | 1 (Orig Addr Type) |
| 4 | 1 (Orig Addr No Plan) |
| 5 | 65-9100-7779 (Orig Addr) |
| 26 | 1 (Dest Addr Type) |
| 27 | 1 (Dest Addr No Plan) |
| 28 | 1-301-5551212 (Dest Addr) |

FIG. 2D

SMR_ROUTING_INFO_RESPONSE — 265

| Byte | Content |
|---|---|
| 1 | 32100 (Message Reference) |
| 2 | 310-006-1-54321 (IMSI) |
| 23 | 1 (MSC Addr Type) |
| 24 | 1 (MSC Addr No Plan) |
| 25 | 1-703-9618308 (MSC Addr) |

FIG. 2E

ACK — 275
MTP OPC  2.321.6 (Teleglobe STP)
MTP DPC  1.234.5 (SMSC)

SCCP CallingParty  1-703-9618308 (Virtual HLR)
SCCP CalledParty   Route on DPC and SSN (8)

GSM MAP IMSI         310-006-1-54321
GSM MAP MSC Number   1-703-9618308 (Virtual MSC)

FIG. 2F

ACK — 295
MTP OPC  001-044-246 (VNM)
MTP DPC  001-044-230 (Teleglobe)

SCCP CallingParty  1-703-9618308 (Virtual HLR)
SCCP CalledParty   65-9100-7779 (SMSC)

GSM MAP IMSI         310-006-1-54321
GSM MAP MSC Number   1-703-9618308 (Virtual MSC)

FIG. 2G

SendRoutingInfoForSM — 205
MTP OPC  1.234.5 (SMSC)
MTP DPC  2.321.6 (Teleglobe)

SCCP CallingParty  65-9100-7779 (SMSC)
SCCP CalledParty   1-301-5551212 (MSISDN)

GSM MAP MSISDN       1-301-5551212 (MSISDN)
GSM MAP SM-RP-PRI    N/A
GSM MAP Svc Cntr Addr  65-9100-7779 (SMSC)

FIG. 2A

Teleglobe GTT Rules (Partial) — 225

| Number | Point Code | SSN |
|---|---|---|
| 1-201-1110000 | 001-044-246 | 6 |
| 1-301-5551212 | 001-044-246 | 6 |
| 1-703-9618308 | 001-044-246 | 8 |
| 1-989-9969999 | 001-044-246 | 6 |

FIG. 2B

SendRoutingInfoForSM — 235
MTP OPC  003-005-001 (Teleglobe STP)
MTP DPC  001-044-246 (VNM)

SCCP CallingParty  65-9100-7779 (SMSC)
SCCP CalledParty   Route On DPC and SSN (6)

GSM MAP MSISDN       1-301-5551212 (MSISDN)
GSM MAP SM-RP-PRI    N/A
GSM MAP Svc Cntr Addr  65-9100-7779 (SMSC)

FIG. 2C

SYSTEM AND METHOD FOR VIRTUAL CARRIER ADDRESSING AND ROUTING FOR GLOBAL SHORT MESSAGE SERVICE

FIELD OF THE INVENTION

The present invention relates generally to a system and method for addressing and routing of global SMS messages via a Signaling System 7 (SS7) network. More particularly, the present invention relates to a system including a "virtual" Home Location Register (HLR) and a "virtual" Mobile Switching Center that functions in an SS7 environment.

BACKGROUND OF THE INVENTION

Traditionally, the international delivery of SMS messages via SS7 requires the implementation of the Global System for Mobile Communication (GSM) Mobile Application Part (MAP) Send Routing Info for Short Message (SRI for SM), often referred to as "GSM MAP SRI for SM." The delivery requires that the GSM MAP SRI for SM message be sent from the originating carrier's Short Message Service Center (SMSC) or Global Short Message Service Center (GSMSC) to the destination carrier's HLR. The HLR, in turn, looks up the node address of the Mobile Switching Center (MSC) that is currently servicing that subscriber and returns it along with the unique International Mobile Subscriber Identity (IMSI) identifier for the handset in the SRI for SM response. The ensuing FSM is then sent from the international carrier's network to the MSC's node address. "FSM" refers to the ForwardShortMessage SS7 message that is used to actually convey or pass an SMS message.

Presently, to bridge the gap between the GSM "world" and American Mobile Standards, such as TDMA, network intermediaries have emerged. Such intermediaries receive SMS messages from one carrier and forward the message to another carrier that may be implemented using another standard. However, an intermediary is not itself a carrier, and, as such, has access to neither a HLR, nor a SMSC (or GSMC). Consequently, there is no real access to subscriber information. Nevertheless, the intermediary must support the SRI for SM mechanism if it is to provide complete service between an international carrier and a domestic carrier.

BRIEF SUMMARY OF THE INVENTION

The present invention provides a means for an intermediary to support the SRI for SM mechanism by providing a virtual HLR and a virtual SMSC (or GSMC).

More specifically, the present invention relates to addressing and routing SMS messages from international (foreign) subscribers to domestic subscribers. Aspects of the present invention enable messages to be transmitted between mobile stations through application of various functionalities including transforming message format, providing addressing and routing information, and creating virtual HLRs and virtual SMSCs.

In one aspect of the present invention, a method for routing a message from a first mobile station to a second mobile station is provided. The method includes receiving a routing request from a third party for routing a message from the first mobile station to the second mobile station, the routing request being received by an intermediary, determining to which carrier the second mobile station subscribes, creating an identifier based on the subscribed carrier, returning a routing response from the intermediary to the third party for routing the message from the first mobile station to the second mobile station, the routing response including the identifier and information identifying the intermediary, from the point of view of the first mobile station, as a mobile switching center (MSC), or in the case of an SMS message, an SMSC.

In a further aspect, determining the appropriate carrier includes performing a lookup of the second mobile station against a database having a plurality of mobile stations associated with a plurality of carriers so that the intermediary functions as a virtual HLR.

In other aspects, the first mobile station may be an international mobile station such that a carrier associated with the first mobile station is on a Global System for Mobile Communication (GSM) network. The second mobile station may be a domestic mobile station, and the subscribed to carrier and the intermediary are in geographic proximity.

In another aspect of the present invention, an intermediary network system is provided that includes a virtual networking device and a gateway interface device. The virtual network device may be configured to receive routing requests from third parties for routing a message from one mobile station to another mobile station and to return routing responses to the third parties. The gateway interface device includes a database storing a plurality of mobile station identifiers associated with a plurality of carriers. The gateway interface device may be configured to perform a lookup when provided a specific mobile station identifier and to return the carrier associated with the specific mobile station identifier. The gateway interface device may also be configured to create an identifier based on the associated carrier and to provide information to the virtual network device including the identifier based on the associated carrier and information identifying the intermediary, from the point of view of the specific mobile station, as a message or mobile switching center. As such, the virtual network device and the gateway interface device function as a virtual HLR and a virtual MSC such that, from the point of view of the third party, the intermediary appears to have a HLR and a MSC.

In a further aspect, the intermediary may periodically upload information, including mobile station identifiers of carriers supported by the intermediary, to the third parties.

The foregoing and other features of the present invention and their attendant advantages will be more fully appreciated upon a reading of the following detailed description in conjunction with the associated drawings.

BRIEF DESCRIPTION OF THE DRAWINGS

FIGS. 2A-2G show various message requests or look-up tables that are used in implementing the method shown in FIG. 2.

DETAILED DESCRIPTION OF THE INVENTION

Figure 1:
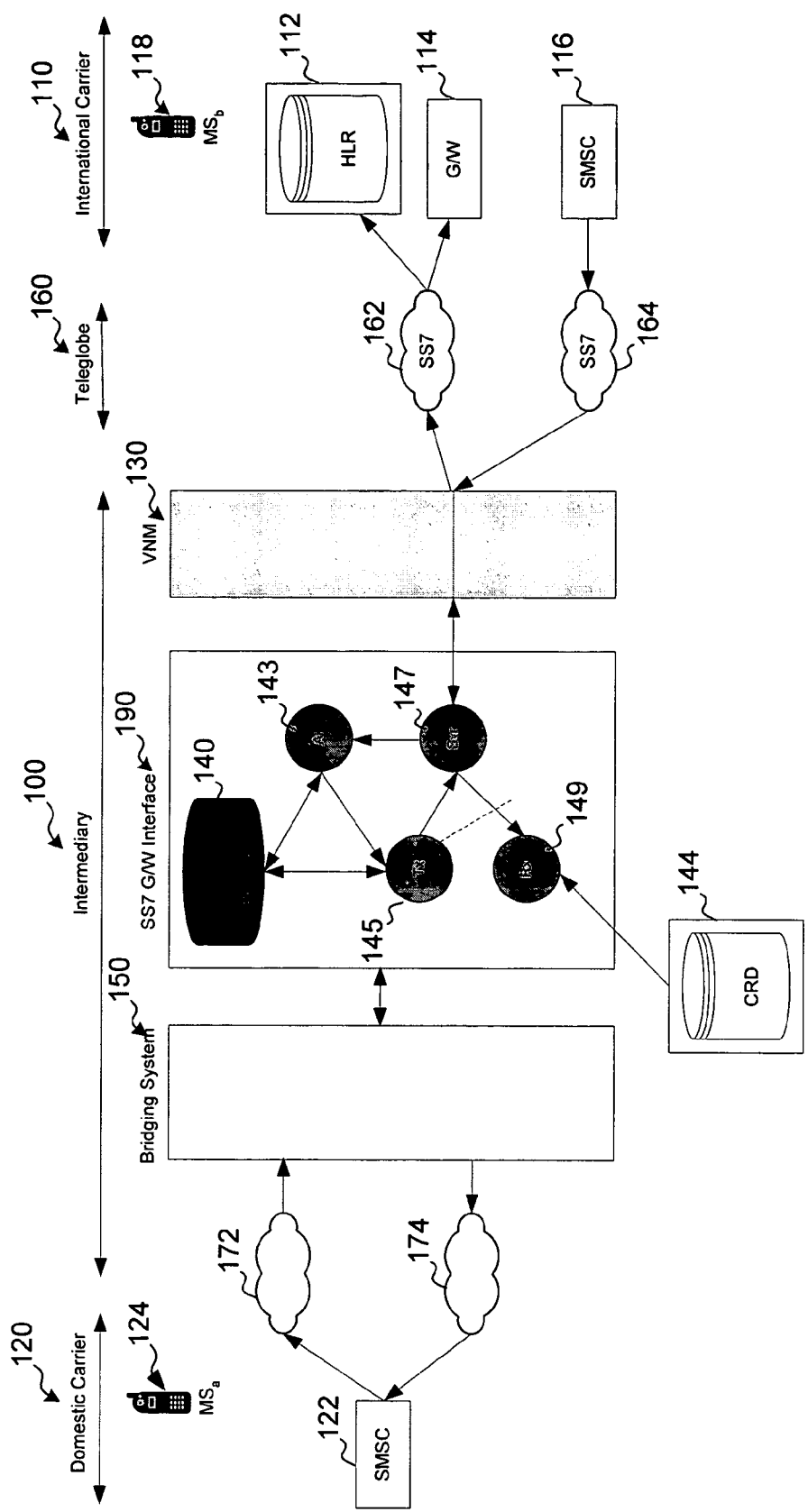
FIG. 1 is a schematic diagram of an intermediary in communication with both an international carrier and a domestic carrier to provide addressing and routing of global SMS messages via a SS7 network according to an exemplary embodiment of the invention.

The present invention addresses the problems that an intermediary, which is not itself a carrier, may encounter when transmitting a SMS from an international caller to a domestic caller using the GSM MAP SRI for SM by providing a virtual HLR and a virtual SMSC (or GSMC) that are "controlled" by the intermediary.

Before an embodiment of the invention is described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 shows an intermediary 100 for addressing and routing global SMS messages in communication with an international carrier 110 and a domestic carrier 120. In the exemplary embodiments, the intermediary 100 includes a Virtual Network Milborne (VNM) 130, a SS7 Gateway Interface 140, and a bridging system 150, like that described in co-pending application Ser. No. 10/426,662, filed May 1, 2003, and assigned to Inphomatch, Inc. VNM is a commercially available product from Telesoft (United Kingdom). The VNM is effectively a protocol converter, sending/receiving SS7 messages on one of its sides and receiving/sending Internet Protocol (IP) messages on its other side using mapping or conversion software. Those skilled in the art will appreciate that other similar systems are available from other vendors. It is noted that VNM 130 is merely a protocol converter, and operates in conjunction with the present invention.

The SS7 Gateway Interface 140 includes a Persistence database 142, a Composite Routing Data database 144, and several additional components identified as Al 143, Tx 145, Svr 147, and Rx 149, interconnected as shown. Each of these components is described below.

Persistence Database. If the SS7 subsystem is unable to deliver an SMS message (e.g., the destination MS is temporarily unavailable) then the SMS message may be stored in this repository until it can be delivered at some point in the future.

CRD. Composite Routing Data (CRD) houses full and complete information on telephone number assignments under the North American Numbering Plan (NANP), preferably including up-to-the-second real-time notifications of number porting and number pooling events.

Al. An Alert process, responsible for de-queuing messages from the Persistence Database when an alert notification (e.g., a MS is now available) is received.

Tx. A Transmitter process, responsible for constructing Internet Protocol (IP) messages (that represent or encapsulate SS7 messages) and writing those messages to the VNM platform.

Rx. A Received process, responsible for accepting Internet Protocol (IP) messages (that represent or encapsulate SS7 messages) that are read from the VNM platform.

Svr. A central Transaction Control Protocol (TCP)/Internet Protocol (IP) server that controls communication with the VNM platform.

The SS7 Gateway Interface 140 shares information with both VNM 130 and bridging system 150. Bridging system 150, in turn, is in communication with one or more domestic carriers 120 and VNM 130 is in communication with one or more international carriers 110. In the embodiment shown in FIG. 1, Teleglobe 160 assists in transferring SMS messages by converting information requests and responses from an international format, such as International Telecommunication Union (ITU) format, to a domestic format, such as American National Standard Institute format (ANSI). Teleglobe acts as an SS7 access provider, granting physical access to Teleglobe's SS7 cloud, performing the indicated ITU⇆ANSI conversion operations, and supporting the proper delivery of SS7 messages through appropriate routing table updates.

As shown, an exemplary international carrier 110 includes a HLR 112, a Gateway 114, and a SMSC 116. A SS7 network 162 connects the HLR 112 and Gateway 114 with VNM 130. Another SS7 network 164 connects the SMSC 116 with VNM 130. Although two SS7 networks are shown connecting the international carrier 110 to VNM 130 through Teleglobe 160, it is understood that there may be a single SS7 network. One or more Mobile Subscribers (MSs), such as $MS_b$ 118 is associated with international carrier 110.

The exemplary domestic carrier 120 may also include a SMSC 122. Typically, a domestic carrier 120 will also have a HLR and a Gateway, but they are not accessed by the intermediary 100 in this arrangement. As seen in FIG. 1, there may be more than one network, such as a SS7 network (e.g., networks 172, 174) that is in communication with SMSC 122 and bridging system 150. This allows the intermediary to pick the best network available at any given point in time to communicate with the domestic carrier 120. One or more MSs, such as $MS_a$ 124 is associated with domestic carrier 120.

Notably, the domestic carrier 120, through agreements with intermediary 100, provides a list of MSs associated with the carrier to intermediary 100, which in turn is used to update Teleglobe 160. The intermediary 100 stores this information, along with other relevant information, in its CRD database 144. This information is accessed by the intermediary when $MS_b$ 118 attempts to send a SMS message to $MS_a$ 124.

Figure 2:
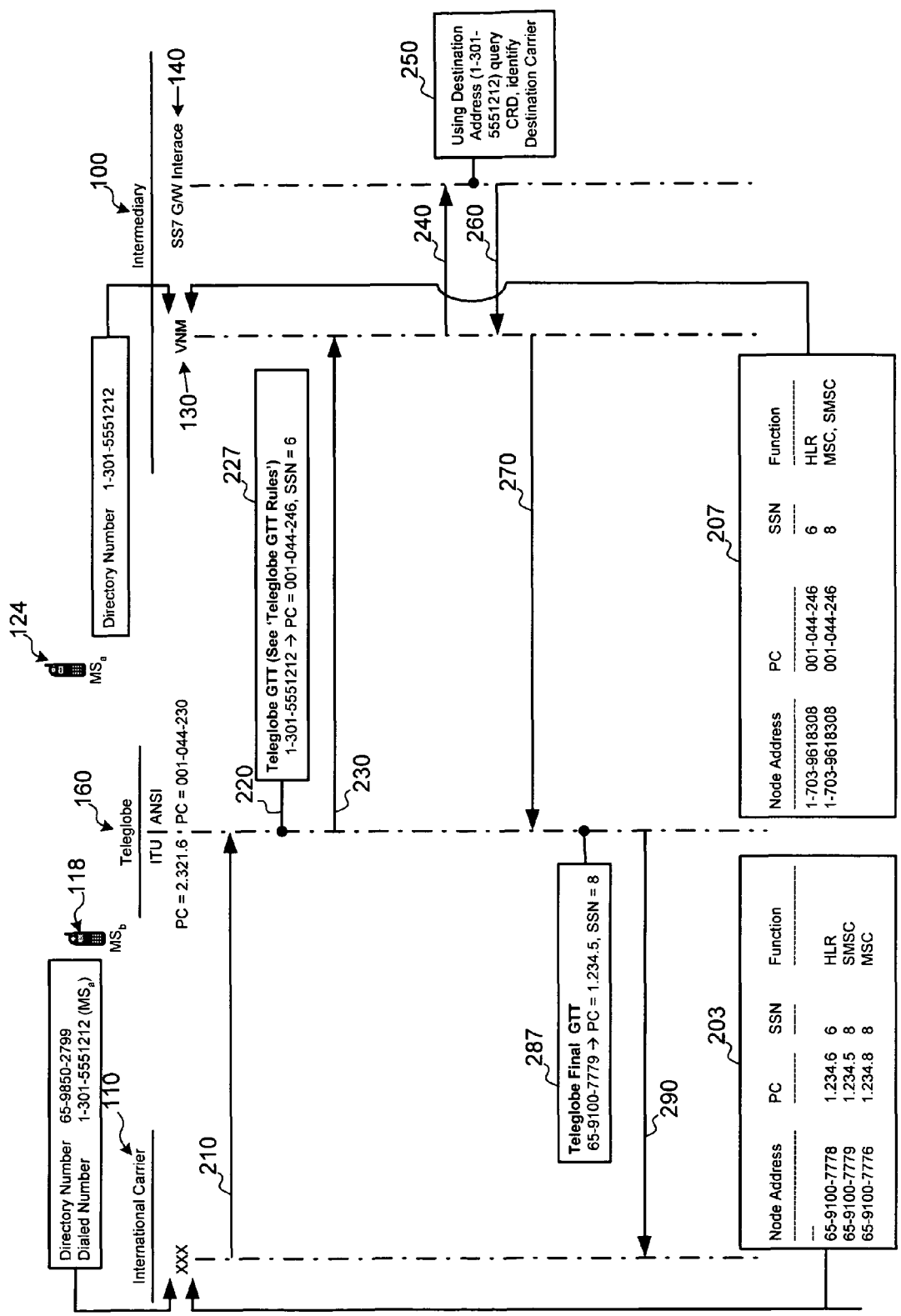
FIG. 2 is a flow diagram of a method for addressing and routing global SMS messages according to the exemplary embodiment of the invention.

FIG. 2 shows one method, along with the data transmitted, to allow $MS_b$ 118 to send a SMS message to $MS_a$ 124. As described above, delivering the SMS message requires that the GSM MAP SRI for SM message be sent from the originating carrier's Short Message Service Center (SMSC) or Global Short Message Service Center (GSMSC) to the destination carrier's HLR. Because the intermediary 100 does not have a HLR or a SMSC, virtual HLR and virtual MSC mechanisms are provided to route global SMS messages via SS7. The virtual HLR allows the GSM MAP SRI for SM messages to be processed by the intermediary even though the intermediary is not a network that directly serves any subscribers. FIG. 2 demonstrates how the virtual HLR and virtual MSC mechanism are involved in a typical call flow.

In FIG. 2, the international carrier 110 has several different identifiers depending on the function accessed, as shown in data set 203. For example, for the SMSC function, the international carrier 110 has a Node Address 65-9100-7779, a Point Code (PC) 1.234.4, and a Subsystem Number (SSN) 8. Intermediary 100 also has identifiers associated with the particular functions performed by the intermediary 100. The Node Address 1-703-9618308 and PC 001-044-246 are the same irregardless of the function (i.e., virtual HLR, virtual SMSC, and MSC). A separate SSN, SSN 6, has been provided for the virtual HLR. These identifiers are used routing a SMS message between $MS_b$ 118 and $MS_a$ 124.

In the exemplary method shown, $MS_b$ 118, of international carrier 110 originates a SMS message that is addressed to (i.e., is destined for) $MS_a$ 124, a MS of domestic carrier 120, which is indirectly serviced by the intermediary 100. For exemplary purposes only, $MS_b$ 118 has a Directory Number (DN) 65-9850-2799 and $MS_a$ 124 has a DN 1-301-5551212.

The international carrier's SMSC (not shown in FIG. 2) receives $MS_b$'S 118 SMS message and dispatches a SendRoutingInfoForSM request message 205 (see FIG. 2A) at step 210 to Teleglobe 160. For example, the SMSC, which resides at PC 1.234.5 and node address 65-9100-7779, constructs SendRoutingInfoForSM request message 205 and issues that message to Teleglobe's ITU facing access point (at PC 2.321.6).

This request message 205 may include information regarding a Message Transfer Part (MTP) Originating Point Code (OPC), a MTP Destination Point Code (DPC), a Signaling Connection Control Point (SCCP) CallingParty, a SCCP Called Party, a GSM MAP Mobile Station ISDN Number (MSISDN), a GSM MAP SM-RP-PRI, and a GSM Svc Cntr Addr. The SM-RP-PRI field is one of many fields that are defined by the GSM MAP specification in the SRIForSM and FSM SS7 messages. For completeness, the specification identifies the SM-RP-PRI field as—"This parameter is used to indicate whether or not delivery of the short message shall be attempted when a service center address is already contained in the Message Waiting Data file."

As seen in the FIG. 2, the request message is received by Teleglobe 160 at PC 2.321.6 where it completes the necessary message conversions from ITU to ANSI and performs a Global Title Translation (GTT) operation at step 220. The GTT operation utilizes the list of Numbering Plan Area (NPA)-Exchange (NXX) ranges stored in look-up table 225 (see FIG. 2B), which the intermediary 100 periodically supplies to Teleglobe 160, to 'map' the DN of the recipient or destination MS (i.e., 1-301-5551212) to the PC 001-044-246 of the intermediary's VNM 130. This information is returned in a data set 227.

At step 230, Teleglobe 160 issues a converted and properly-addressed SendRoutingInfoForSM request message 235 (see FIG. 2C) to the intermediary's VNM 130. In this request message 235, the MTP OPC, the MTP DPC, and the SCCP Called Party are updated to reflect the request message originating from Teleglobe 160 and being transmitted to the intermediary 100.

The VNM 130 receives the SendRoutingInfoForSM request message 235 on its SS7 side, constructs a SMR_GET_ROUTING_INFO message 245 (in accordance, in this case, with Telesoft's platform) (see FIG. 2D) on its Internet Protocol (IP) side, and issues that message out its IP side, at step 240. The SMR_GET_ROUTING_INFO message 245 includes various information including the Originating Address (65-9100-7779) and the Destination Address (1-301-5551212).

The intermediary's SS7 Gateway Interface 140 software process, at step 250, accepts the SMR_GET_ROUTING_INFO IP-side message, retrieves the value of the Destination Address data element (which in this case is 1-301-5551212, the DN of the recipient or destination MS), and performs a number resolution or lookup operation against the intermediary's CRD database 144 to identify the carrier that currently services the indicated DN.

The intermediary's SS7 Gateway Interface 140 transmitter software process, at step 260, constructs a SMR_ROUTING_INFO_RESPONSE IP-side message 265 (in accordance, in this case, with Telesoft's platform) (see FIG. 2E). The message indicates that the intermediary's virtual Mobile Switching Center (MSC), which resides within VNM 130 at node address 1-703-9618308, currently services the recipient or destination MS. The message also includes an artificial International Mobile Subscriber Identity (IMSI) value, which is created by combining the MCC, MNC, Internal Receiver ID, and Internal Index into the following format:

MCC-MNC-Internal Receiver ID-Internal Index.

For the above scenario, the IMSI may be 310-006-1-54321. The creation of the IMSI will be described in further detail below.

The SMR_ROUTING_INFO_RESPONSE IP-side message 265 is submitted to the IP side of the VNM 130. The intermediary's VNM 130 constructs a SendRoutingInfoForSM response or acknowledgement message 275 (see FIG. 2F) at step 270 and issues that message to Teleglobe's 160 ANSI facing access point (at PC 001-044-230). The SendRoutingInfoForSM response message 275 includes the virtual HLR Node Address for the SCCP CallingParty, the virtual MSC Node Address for the GSM MAP MSC Number, and a GSM MAP IMSI. Significantly, the virtual HLR Node Address and the virtual MSC Node Address are the same, but from the point of view of Teleglobe 160 and international carrier 110, they exist as if they were an actual HLR and MSC.

Teleglobe 160 completes the necessary message conversions (ANSI to ITU) and performs a GTT operation (for simplicity, illustrated here as a final GTT operation). The GTT operation 'maps' the node address of the destination SMSC (65-9100-7779) to the PC 1.234.5, which was returned as a data set 287.

Finally, at step 290, Teleglobe 160 issues a converted and properly-addressed SendRoutingInfoForSM response message 295 (see FIG. 2G) to the destination SMSC of the international carrier 110 so the international carrier can send the SMS message to the virtual MSC address for final transmission to $MS_a$ 124.

As indicated above, the intermediary 100 is not itself a carrier and, therefore, does not implement a real HLR. Moreover, the intermediary 100 does not have any access to real subscriber information. Nevertheless, the intermediary 100 must support the SRI for SM mechanism. The virtual HLR in accordance with the present invention works by returning its node address as the MSC value and by generating a unique IMSI value based on a few fields, as explained below.

To create the IMSI value, the intermediary 100, upon receipt of a SRI for SM message, performs a WNP lookup on the called MS-ISDN value. "WNP" refers to Wireless Number Portability. This lookup determines the intemediary's internal carrier id for the carrier that currently services that number. If the lookup fails for some reason, an error is returned with the value "unknown subscriber." Once the carrier id is determined, that value is used as an index into a separate table that maps carrier id's to MCC/MNC pairs, which serve as the first 6 digits of the IMSI. Each carrier customer of the intermediary has a unique MCC/MNC pair. The next field is an internal id of the actual component that processed the SRI for SM message. There may be several components working in parallel and this id is used to distinguish them. It is used to ensure that the ensuing FSM is processed by the same component. Finally, the last 5 digits of the IMSI are the internal message id that is assigned to each message by the VNM platform.

In the above example, the SRI for SM response would contain IMSI value 310-006-1-54321. The MCC/MNC pair for the destination carrier is 310/006, the receiver that processed the SRI for SM has an id of 1, and the message reference that the VNM assigned to that SRI for SM message is 54321. The IMSI value essentially serves as a session id for the entire SMS transaction. The intermediary 100 uses the IMSI value to identify the SRI for SM message and forwards it to the proper domestic MS. The "artificial" IMSI value serves to 'link' a preparatory SRIF or SM SS7 message and a subsequent FSM SS7 message. As noted, all of this is hidden from the carrier's perspective.

An advantage of this method and system is that the virtual HLR creates virtual subscribers via a process that generates a unique value for the IMSI field of the response to the SRI for SM message. The virtual MSC allows the FSM MAP messages to be decoded and converted into the intermediary's proprietary format, as desired. Both the virtual HLR and the virtual MSC share the same node address, thereby collapsing the functions of what would typically be two network nodes into a single level. This process is accomplished in a manner by which the far end network is unaware of this. From its perspective, the intermediary's virtual HLR is a real HLR and the virtual MSC is a real MSC.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for routing a message from a first mobile station to a second mobile station, comprising:
    receiving a routing request from a third party for routing a message from the first mobile station to the second mobile station, the routing request being received by an intermediary, wherein the intermediary operates neither a physical home location register (HLR) nor a physical mobile switching center (MSC);
    determining to which carrier the second mobile station subscribes;
    dynamically creating an artificial International Mobile Subscriber Identity (IMSI) value based, at least in part, on the carrier to which the second mobile station subscribes, wherein the artificial IMSI value is not an IMSI value assigned to the second mobile station; and
    returning a routing response from the intermediary to the third party for routing the message from the first mobile station to the second mobile station, the routing response including the artificial IMSI value, such that the intermediary is considered, from the point of view of the third party, a mobile switching center,
    wherein the steps of receiving and returning employ SS7.

2. The method according to claim 1, wherein the mobile switching center is a virtual mobile switching center.

3. The method according to claim 1, wherein determining to which carrier the second mobile subscribes includes performing a lookup of the second mobile station against a database including a plurality of mobile stations associated with a plurality of carriers so that the intermediary functions as a virtual home location register.

4. The method according to claim 1, wherein the second mobile station is a domestic mobile station, and the carrier to which the second mobile station subscribes and the intermediary are in geographic proximity.

5. The method according to claim 4, wherein the first mobile station is an international mobile station and a carrier associated with the first mobile station is on a Global System for Mobile Communication (GSM) network.

6. A method for routing a Global System for Mobile Communication (GSM) Mobile Application Part (MAP) Send Routing Info for Short Message (SRI for SM) message from a third party in connection with sending a message from a first mobile station on a GSM network to a second mobile station, comprising:
    receiving a routing request from the third party for routing a message from the first mobile station to the second mobile station, the routing request being received by an intermediary via a SS7 network;
    determining to which carrier the second mobile station subscribes;
    dynamically creating an artificial International Mobile Subscriber Identify (IMSI) value based, at least in part, on the carrier to which the second mobile station subscribes, wherein the artificial IMSI value is not an IMSI value assigned to the second mobile station; and
    returning a routing response from the intermediary to the third party for routing the message from the first mobile station to the second mobile station, the routing response including the artificial IMSI value, such that the intermediary is considered, from the point of view of the third party, as a mobile switching center.

7. The method according to claim 6, wherein the mobile switching center is a virtual mobile switching center.

8. The method according to claim 6, wherein determining to which carrier the second mobile subscribes includes performing a lookup of the second mobile station against a database including a plurality of mobile stations associated with a plurality of carriers, whereby the intermediary functions as a virtual home location register.

9. The method according to claim 6, wherein the second mobile station is a domestic mobile station and the carrier to which the second mobile station subscribes and the intermediary are in geographic proximity.

10. An intermediary comprising:
    a virtual network device configured to receive, via SS7, routing requests from third parties for routing a message from one mobile station to another mobile station and to return routing responses to the third parties; and
    a gateway interface device including a database storing a plurality of mobile station identifiers associated with a plurality of carriers, the gateway interface device being configured to perform a lookup to determine to which carrier the another mobile station subscribes when provided a specific mobile station identifier and to return the carrier associated with the specific mobile station identifier, the gateway interface device being configured to create an artificial International Mobile Subscriber Identity (IMSI) value based, at least in part, on the associated carrier and to provide to the virtual network device the artificial IMSI value such that the intermediary appears, from the point of view of third parties, as a mobile switching center, wherein the artificial IMSI value is not an IMSI value assigned to the another mobile station, and
    wherein the virtual network device and the gateway interface device communicate such that, from the point of view of third parties, the intermediary appears to operate a HLR and a MSC.

11. The intermediary according to claim 10, wherein the intermediary periodically uploads information including mobile station identifiers of carriers supported by the intermediary to the third parties.

12. The method of claim 1, wherein the artificial International Mobile Subscriber Identify (IMSI) value comprises a mobile country code (MCC), a mobile network code (MNC), an internal receiver ID associated with an intermediary component that processed an SRI for SM message, and an index number assigned by the intermediary.

13. The method of claim 6, wherein the artificial International Mobile Subscriber Identify (IMSI) value comprises a mobile country code (MCC), a mobile network code (MNC), an internal receiver ID associated with an intermediary component that processed an SRI for SM message, and an index number assigned by the intermediary.

14. The intermediary of claim 10, wherein the artificial International Mobile Subscriber Identify (IMSI) value comprises a mobile country code (MCC), a mobile network code (MNC), an internal receiver ID associated with an intermediary component that processed an SRI for SM message, and an index number assigned by the intermediary.

* * * * *

UNITED STATES PATENT AND TRADEMARK OFFICE
CERTIFICATE OF CORRECTION

| | | |
|---|---|---|
| PATENT NO. | : 7,860,498 B2 | Page 1 of 1 |
| APPLICATION NO. | : 10/724106 | |
| DATED | : December 28, 2010 | |
| INVENTOR(S) | : Robert C. Lovell, Jr. | |

It is certified that error appears in the above-identified patent and that said Letters Patent is hereby corrected as shown below:

Column 3, line 15, replace "Gateway Interface 140" with -- Gateway Interface 190 --;

line 27, replace "Gateway Interface 140" with -- Gateway Interface 190 --;

line 28, replace "database 142" with -- database 140 --;

line 49, replace "A Received process" with -- A Receiver process --;

line 55, replace "Gateway Interface 140" with -- Gateway Interface 190 --; and

Column 4, line 48, replace "(PC) 1.234.4" with -- (PC) 1.234.5 --.

Signed and Sealed this
Eighth Day of March, 2011

David J. Kappos
*Director of the United States Patent and Trademark Office*